(12) United States Patent
Lin

(10) Patent No.: US 7,318,666 B1
(45) Date of Patent: Jan. 15, 2008

(54) SAFETY DEVICE FOR BLENDER

(76) Inventor: Kuan-Chih Lin, No. 66, Sec. 1, PO An Road, Jen Te Hsiang, Tainan Hsien (TW)

( * ) Notice: Subject to any disclaimer, the term of this patent is extended or adjusted under 35 U.S.C. 154(b) by 0 days.

(21) Appl. No.: 11/739,108

(22) Filed: Apr. 24, 2007

(51) Int. Cl.
*A47J 43/046* (2006.01)

(52) U.S. Cl. ..................... 366/206; 241/37.5

(58) Field of Classification Search ........ 366/205–206, 366/314, 601; 99/348; 241/37.5
See application file for complete search history.

(56) References Cited

U.S. PATENT DOCUMENTS

| | | | | |
|---|---|---|---|---|
| 2,284,155 | A | * | 5/1942 | Landgraf .................. 241/282.2 |
| 3,612,126 | A | * | 10/1971 | Emmons et al. ....... 241/199.12 |
| 3,785,579 | A | * | 1/1974 | Voglesonger ............ 241/282.1 |
| 3,786,999 | A | * | 1/1974 | Cabell ..................... 241/282.1 |
| 3,892,365 | A | * | 7/1975 | Verdun ........................ 241/92 |
| 4,107,791 | A | * | 8/1978 | Mikituk ...................... 366/205 |
| 4,108,054 | A | * | 8/1978 | Klocker et al. ............... 99/348 |
| 4,111,372 | A | * | 9/1978 | Hicks et al. ............... 241/37.5 |
| 4,200,240 | A | * | 4/1980 | Machuron .................. 241/37.5 |
| 4,213,569 | A | * | 7/1980 | Amiot ....................... 241/37.5 |
| 4,216,917 | A | * | 8/1980 | Clare et al. ................ 241/37.5 |
| 4,269,519 | A | * | 5/1981 | Birr .......................... 366/206 |
| 4,297,038 | A | * | 10/1981 | Falkenbach ................ 366/206 |
| 4,335,860 | A | * | 6/1982 | Grandel et al. ............ 241/37.5 |
| 4,373,677 | A | * | 2/1983 | Kunihiro ................... 241/37.5 |
| 4,396,159 | A | * | 8/1983 | Podell ....................... 241/37.5 |
| 4,487,509 | A | * | 12/1984 | Boyce ........................ 366/199 |
| 4,506,836 | A | * | 3/1985 | Williams ................... 241/37.5 |
| 4,629,131 | A | * | 12/1986 | Podell .......................... 241/36 |
| 4,691,870 | A | * | 9/1987 | Fukunaga et al. ............. 241/36 |
| 4,741,482 | A | * | 5/1988 | Coggiola et al. .......... 241/37.5 |
| 5,323,973 | A | * | 6/1994 | Ferrara, Jr. ................ 241/37.5 |
| 5,338,111 | A | * | 8/1994 | Trocherie et al. ........... 366/205 |
| 5,353,697 | A | * | 10/1994 | Venturati et al. ............. 99/492 |
| 5,567,049 | A | * | 10/1996 | Beaudet et al. ............. 366/206 |
| 5,639,161 | A | * | 6/1997 | Sirianni ...................... 366/314 |
| 5,779,358 | A | * | 7/1998 | Bevington .................. 366/206 |
| 5,809,872 | A | * | 9/1998 | Sundquist .................... 99/492 |
| 6,186,425 | B1 | * | 2/2001 | Celso De Almeida Mattos ......... 241/37.5 |
| 6,209,810 | B1 | * | 4/2001 | Brisard ...................... 241/37.5 |
| 6,350,053 | B1 | * | 2/2002 | Morin ........................ 366/205 |
| 6,513,966 | B1 | * | 2/2003 | Gort-Barten et al. ....... 366/205 |

(Continued)

FOREIGN PATENT DOCUMENTS

DE 2928107 * 1/1981

(Continued)

*Primary Examiner*—Charles E. Cooley
(74) *Attorney, Agent, or Firm*—Leong C. Lei

(57) ABSTRACT

A blender includes a base forming a receiving space in which a positioning seat is formed. The positioning seat defines a through hole. The base houses a motor that is connected to a safety switch. The safety switch has a bar extending through the through hole of the positioning seat. A container has a lower end releasably mounted to a retainer. A movable member is received in the retainer and has pegs extending through the retainer to be engageable and depressible by the lower end of the container when the container is mounted to the container retainer. The container is positionable in the receiving space, and the depressed movable member is fit into the positioning seat to depress downward the bar of the safety switch to thereby actuate the safety switch supplying the power to the motor.

4 Claims, 7 Drawing Sheets

U.S. PATENT DOCUMENTS

| | | | |
|---|---|---|---|
| 6,513,967 B2 * | 2/2003 | Masip et al. | 366/205 |
| 6,540,394 B2 * | 4/2003 | Juriga | 366/205 |
| 6,554,466 B1 * | 4/2003 | Lee | 366/206 |
| 6,568,843 B1 * | 5/2003 | Lai | 366/206 |
| 6,629,492 B1 * | 10/2003 | Li | 99/337 |
| 6,637,681 B1 * | 10/2003 | Planca et al. | 241/37.5 |
| 6,811,303 B2 * | 11/2004 | Dickson, Jr. | 366/206 |
| 6,910,800 B2 * | 6/2005 | Wu | 366/199 |
| 7,018,091 B2 * | 3/2006 | Arroubi et al. | 366/199 |
| 7,063,009 B2 * | 6/2006 | Lin | 99/492 |
| 7,220,049 B2 * | 5/2007 | Lee | 366/206 |
| 2002/0012288 A1 * | 1/2002 | Masip et al. | 366/205 |
| 2002/0071340 A1 * | 6/2002 | Juriga | 366/205 |
| 2004/0042338 A1 * | 3/2004 | Wu | 366/205 |
| 2004/0100862 A1 * | 5/2004 | Arroubi et al. | 366/206 |
| 2006/0028912 A1 * | 2/2006 | Lee | 366/206 |

FOREIGN PATENT DOCUMENTS

| | | | |
|---|---|---|---|
| FR | 2865623 | * | 8/2005 |
| GB | 2417538 | * | 3/2006 |
| JP | 2001-309859 | * | 11/2001 |
| JP | 2001-340238 | * | 12/2001 |
| WO | 99/37193 | * | 7/1999 |

\* cited by examiner

SAFETY DEVICE FOR BLENDER

BACKGROUND OF THE INVENTION (a) Technical Field of the Invention

The present invention relates to a blender, and in particular to a blender comprising a container that is supported on a motor base by a retainer, wherein the blender comprises a safety switch that is actuateable by the retainer mounted to the base.

(b) Description of the Prior Art

A blender is commonly used to make juice of fruits or vegetables by pulverizing and blending the fruits or vegetables with a cutter of shape blades. A conventional blender comprises a motor base on which a container, serving as a receptacle for pieces of fruits and/or vegetables, is mounted. The cutter set is arranged at the bottom of the container and is driven a motor contained in the motor base to pulverize the fruits and/or vegetables. This arrangement makes the conventional blender difficult to clean for the container is very deep and often has a small opening, both limiting the user's hand from easily reaching the bottom of the container. Further, the cutter arranged at the bottom of the container also causes troubles for users to clean the container. As a consequent, residual of the fruits and/or vegetables can easily remain in the container. In addition, the container is often made of glass, and this makes it not possible to mount a safety switch on the container. A solution is to arrange the safety switch on the base in such a location that the safety switch can only be triggered when the container is mounted to the motor base.

FIG. 1 of the attached drawings shows such a known blender, which is broadly designated with reference numeral 1. The conventional blender 1 comprises a base 11 that is connectable to an external power source, a container set 12 that is releasably mounted to the base 11, and a cutter set 13 arranged in the container set 12.

The base 11 comprises a housing 111, a motor 112 enclosed in the housing 111, a plurality of control buttons 113 arranged on an outer surface of the housing 111 for turning on/off the motor 112, and a safety switch 114 arranged on a top of the hosing 111 to which the container set 12 is mounted.

The container set 12 comprises a container retainer 121 that is mounted to the base 11 and a container 122 threadingly mounted to the container retainer 121. The cutter set 13 is arranged inside and at the bottom of the container 122 and comprises blades 131 that are located inside the container 121. The container 122 is provided at an underside thereof with a trigger member 123 corresponding to the safety switch 112.

When a user mounts the container set 12 to the base 11, the trigger member 123 engages and actuates the safety switch 114 to allow electrical power to supply from the external power source to the motor 114. Under this situation, the user may use the control buttons 113 as desired to control the rotation of the motor 112. The motor 112, once turned on, drives the cutter set 13 to rotate and thus pulverize pieces of food received in the container 122. When the user removes the container set 12 from the base 11, the trigger member 123 disengages from and thus de-actuates the safety switch 114. Thus, the motor 112 is disconnected from the external power source. To clean the blender 1, the user may separate the container retainer 121, together with the cutter set 13, from the container 122 to allow easy access to all the corners of the container 122 for complete cleaning.

However, the arrangement of the conventional blender induces certain risks to the user. For example, in case that the user first mounts container retainer 121, together with the cutter set 13, and the trigger member 123 engages and actuates the safety switch 114, making the motor 112 connected to the external power source, when the control buttons 113 are accidentally actuated by the user, the motor 112 is actuated and put into operation to rotate the cutter blades 131. The cutter blades 131 that are unexpectedly put into high speed rotation are extremely dangerous to the user. Alternately, in case the control buttons 113 have already been depressed, at the time when the user inadvertently put the container retainer 121, without the container 122 mounted thereon, to the base 11, the safety switch 114 will be actuated by the trigger member 124 of the container retainer 121 and the cutter set 13 is immediately driven by the motor 112. Again, this is extremely dangerous to the user.

Thus, it is the blender maker's challenge to provide a blender having enhanced safety measure.

SUMMARY OF THE INVENTION

The primary purpose of the present invention is to provide a safety-enhanced blender that overcomes the above discussed problems caused by inadvertent actuation.

Thus, the technical measure of the present invention includes a structure of blender that comprises at least a base, a container, a cutter set, and a cover. The base forms an upper receiving space delimited by a circumferential wall having an inside surface on which a plurality of positioning projections and a positioning seat are formed. The positioning seat defines a through hole at a bottom thereof. The base has an outer surface on which a control knob is provided for controlling the rotation of the cutter set. A bottom lid is mounted to a bottom of the base and a motor is mounted to the bottom lid. The motor is connected to a safety switch. The safety switch has a bar extending through the through hole of the positioning seat. A container retainer is threadingly mounted to a lower end of the container and a movable member is received in the container retainer. The movable member forms a plurality of pegs extending through the container retainer and the pegs are engageable and depressible by a lower edge of the container when the container is mounted to the container retainer so that the movable member is moved downward. Further, when the container is then put into the upper receiving space, the movable member is fit into the positioning seat to depress downward the bar of the safety switch to thereby actuate the safety switch for supplying power to the motor and thus driving the cutter set.

The effect of the present invention is that the movable member can be moved downward only when the container is mounted to the container retainer and then the safety switch can be actuated to allow supply of power to the motor. As a consequence of this arrangement, individually mounting the container retainer to the upper receiving space of the base does not actuate the safety switch and power is not supplied to the motor whereby unexpected operation of the motor is eliminated. Thus, risk to the user caused by accident actuation of the control knob can be prevented.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
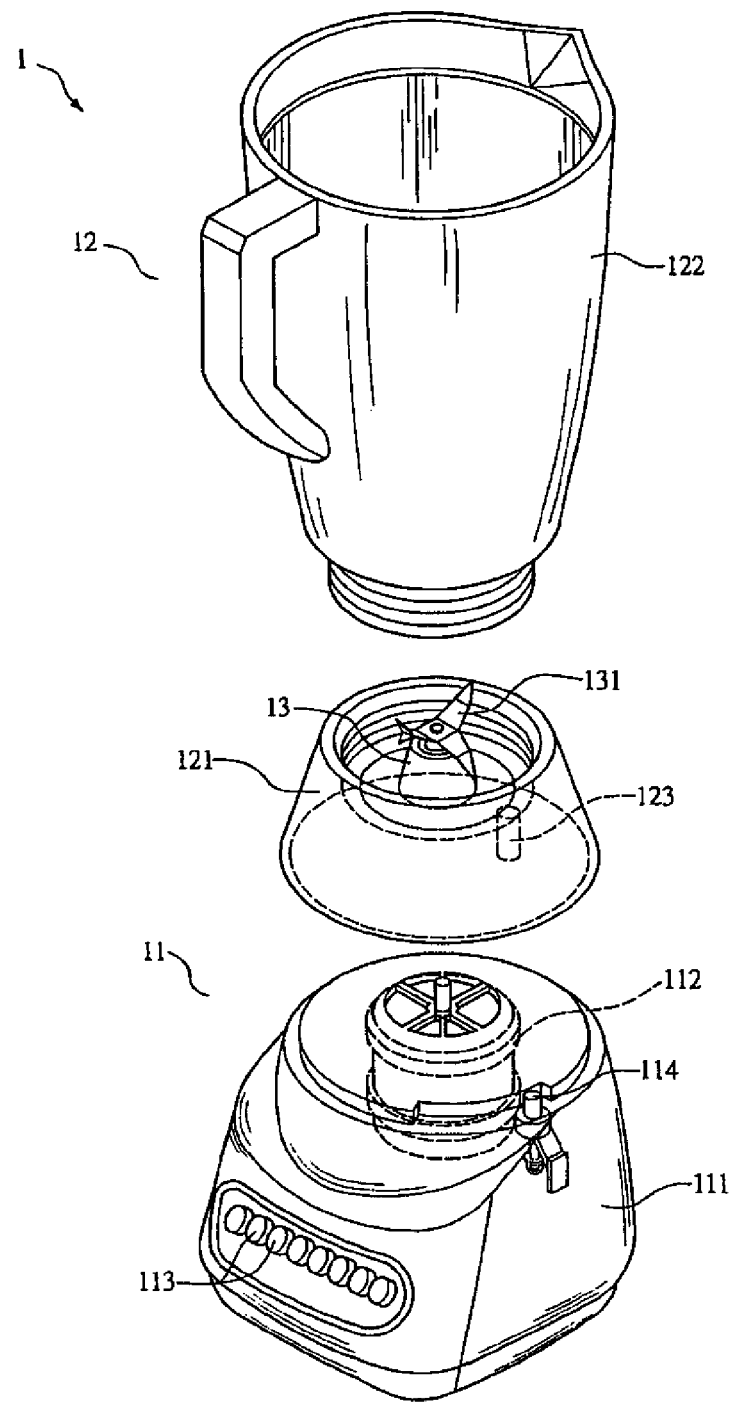
FIG. 1 is an exploded view of a conventional blender.
Figure 2:
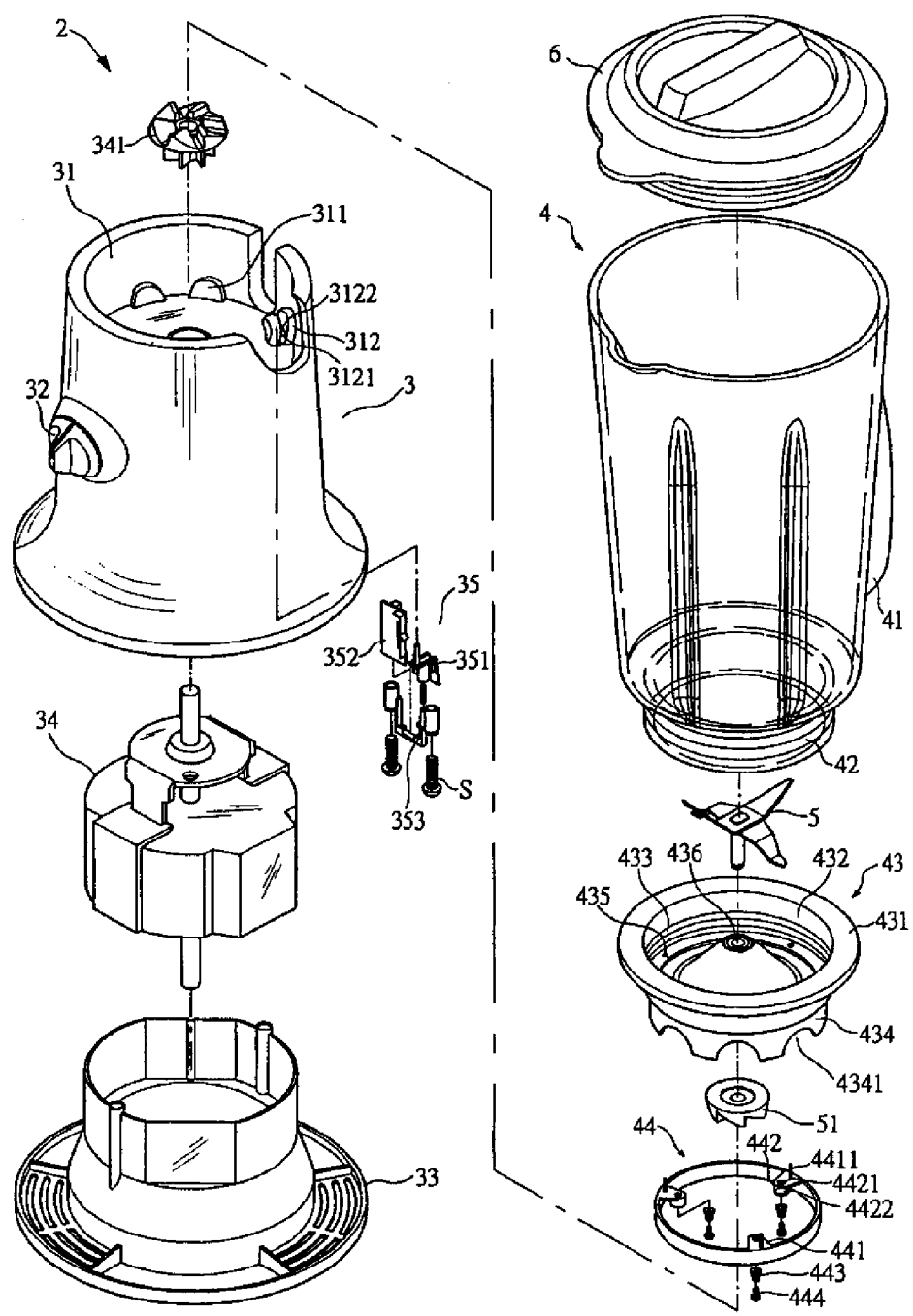
FIG. 2 is an exploded view of a blender constructed in accordance with the present invention.

With reference to the drawings, and in particular to FIG. 2, a blender constructed in accordance with the present invention, generally designated with reference numeral 2, comprises at least a base 3, a container 4, a cutter set 5, and a cover 6.

Figure 3:
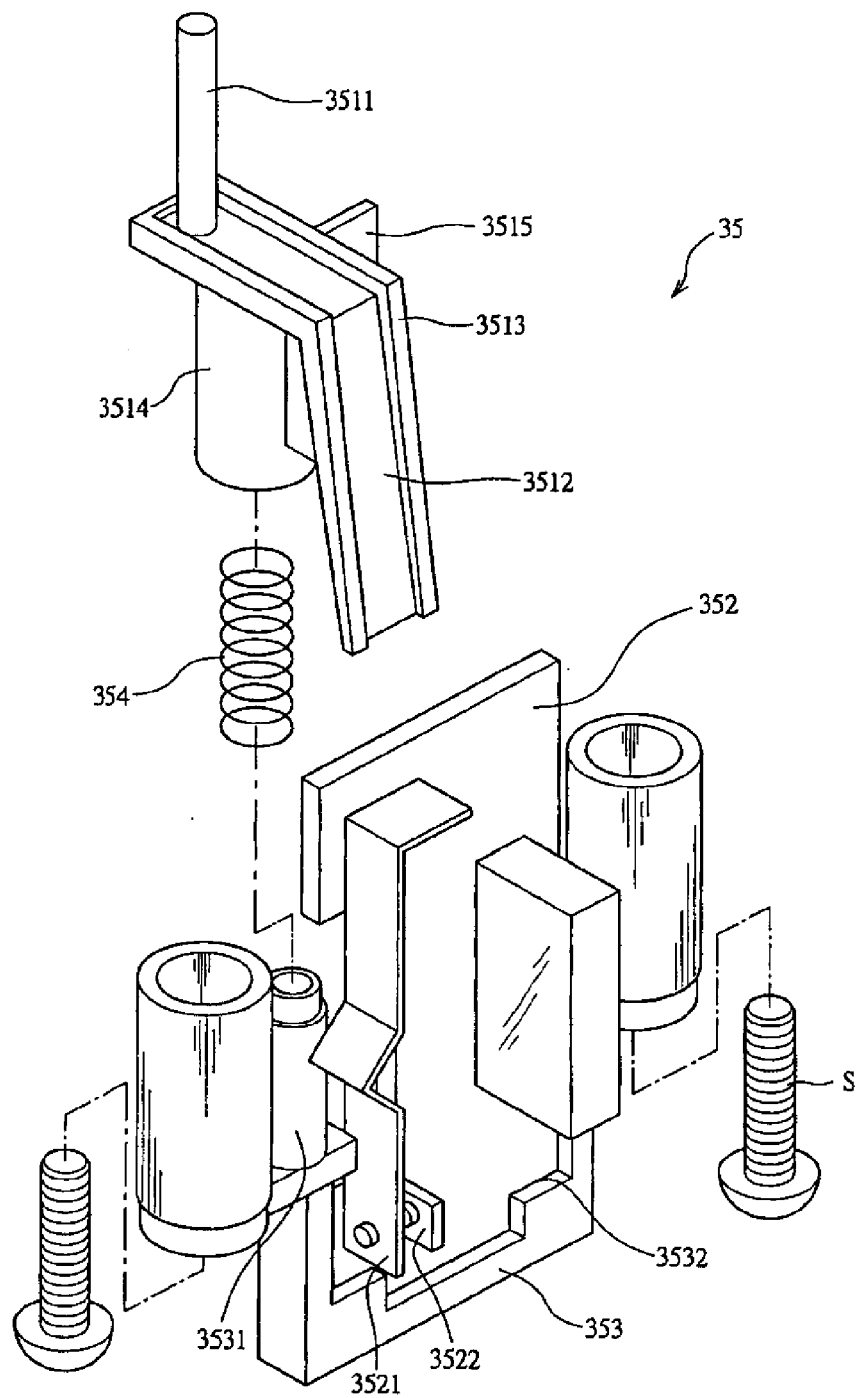
FIG. 3 is an exploded view of a safety switch of the blender of the present invention.

The base 3 comprises a housing forming an upper receiving space 31 delimited by a circumferential wall having an inside surface on which a plurality of positioning projections 311 and a positioning seat 312, both being in the form of semi-circle, are formed. The positioning seat 312 forms a central groove 3121 having a bottom in which a through hole 3122 is formed. The housing of the base 3 forms, on an outside surface thereof, a control knob 32, which controls the rotation speed of the cutter set 5. A bottom lid 33 is provided to a lower end of the base 3. A motor 34 is fixed on a central portion of the bottom lid 33. The motor 34 has a spindle to which a driving disk 341 is mounted. The motor 34 is electrically connected to and controlled by a safety switch 34. The safety switch 35 comprises an actuator 351, a micro-switch substrate 352, and a substrate support 353. Also referring to FIG. 3, the actuator 351 comprises a bar 3511 and a chute 3512. Two barrier walls 3513 are respectively formed along opposite edges of the chute 3512. The actuator 351 also comprises a collar 3514 and a drive plate 3515. The collar 3514 is fit over a retention pin 3531 formed on the substrate support 353. A resilient element 354 is interposed between the collar 3514 and the retention pin 3531. The substrate support 353 forms a receiving slot 3532 for receiving and retaining the micro-switch substrate 352 therein.

Figure 4:
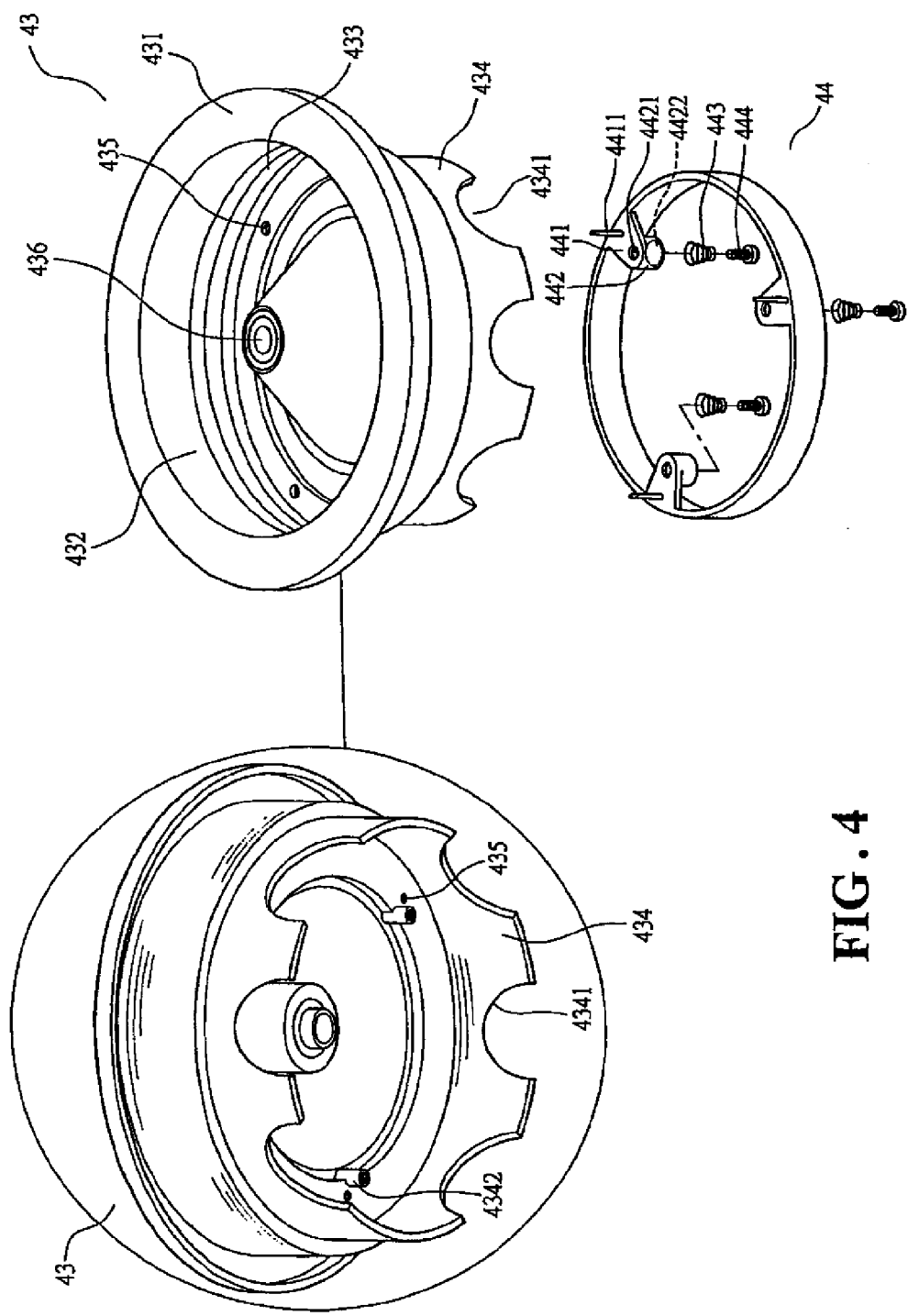
FIG. 4 is a perspective view illustrating a container retainer and a movable member of the blender of the present invention in a separated condition.

The container 4 is a hollow receptacle to which a handle 41 is mounted. The container 5 has a bottom or lower end forming a threaded section 42. The threaded section 42 of the container 4 is threadingly engageable with a container retainer 43. A movable member 44 is arranged below the container retainer 43. Also referring to FIG. 4, the container retainer 43 has a top flange 431 having an inner edge that is extended in a vertically downward direction to define a receiving space 432. An inside circumferential surface of the receiving space 432 forms a threaded section 433 that is engageable with the threaded section 42 of the container 4. The container retainer 43 is also provided with a circumferential wall 434 that extends from a bottom of the container retainer 43. Formed in a circumferential edge of the circumferential wall 434 is a plurality of recesses 4341 corresponding to the positioning projections 311 and the positioning seat 312. The bottom of the container retainer 43 forms a plurality of through holes 435. Also, inboard the circumferential wall 434, a plurality of posts 4342 extends downward from the underside of the bottom of the container retainer 43 at locations close to the through holes 435. Each post 4342 defines an internally-threaded hole. The movable member 44 is received inside the circumferential 434. The movable member 44 is for example, in the form of a cylinder having a circumferential wall having an inside surface from which a plurality of lugs 441 extends inwardly. A hollow cylinder 442 extends downward from each lug 441 and the cylinders 442 are arranged to correspond to the posts 4342 respectively. Each cylinder 442 forms a bore having a small upper opening 4421 for the extension of the respective post 4342 and an opposite large lower opening 4422 through which a resilient element 443 is received in the bore. The resilient element 443 so received in the bore of the cylinder 442 is fit over the outer surface of the post 4342 that is inserted into the bore through the upper opening 442. A bolt 444, having an expanded end, is fit into the engages the internally-threaded hole of the post 4342 to secure the resilient element 443 to the post 4342. Preferably, the resilient element 443 comprises a conically-shaped coil spring having a large-diameter upper end engaging around the upper opening 4421 of the cylinder 442 and a small-diameter lower end retained by the expanded end of the bolt 444. Each lug 441 of the movable member 44 is provided with at least one peg 4411, which is received through the respective through hole 435 of the container retainer 43 and is thus extendable into the receiving space 432 of the container retainer 43. The container retainer 43 also forms a bore 436 for mounting the cutter set 5.

The cutter set 5 is rotatably mounted to the bore 436 of the container retainer 43 by inserting a shaft portion thereof through the bore 436. A driven disk 51 is arranged below the bottom of the container retainer 43 and inside the circumferential wall 434. The driven disk 51 is coupled to a lower end of the shaft portion of the cutter set 5 that extends beyond the bottom of the container retainer 43.

The cover 6 is releasably attached to and thus closes an upper opening of the container 4 to prevent splashing of juice or other liquid that is made inside the container 4.

Figure 5:
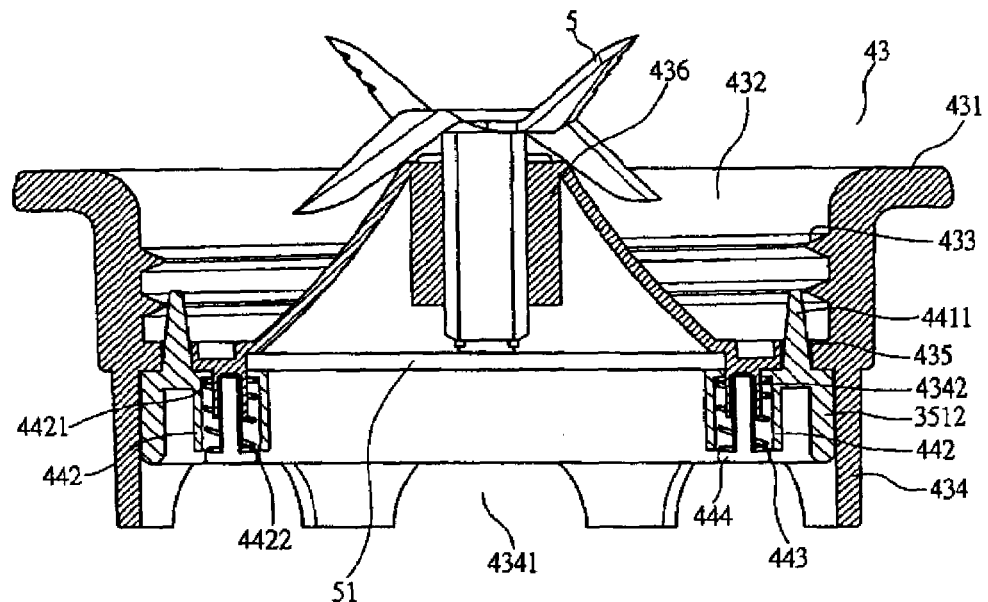
FIG. 5 is a cross-sectional view of the container retainer and the movable member assembled together.
Figure 8:
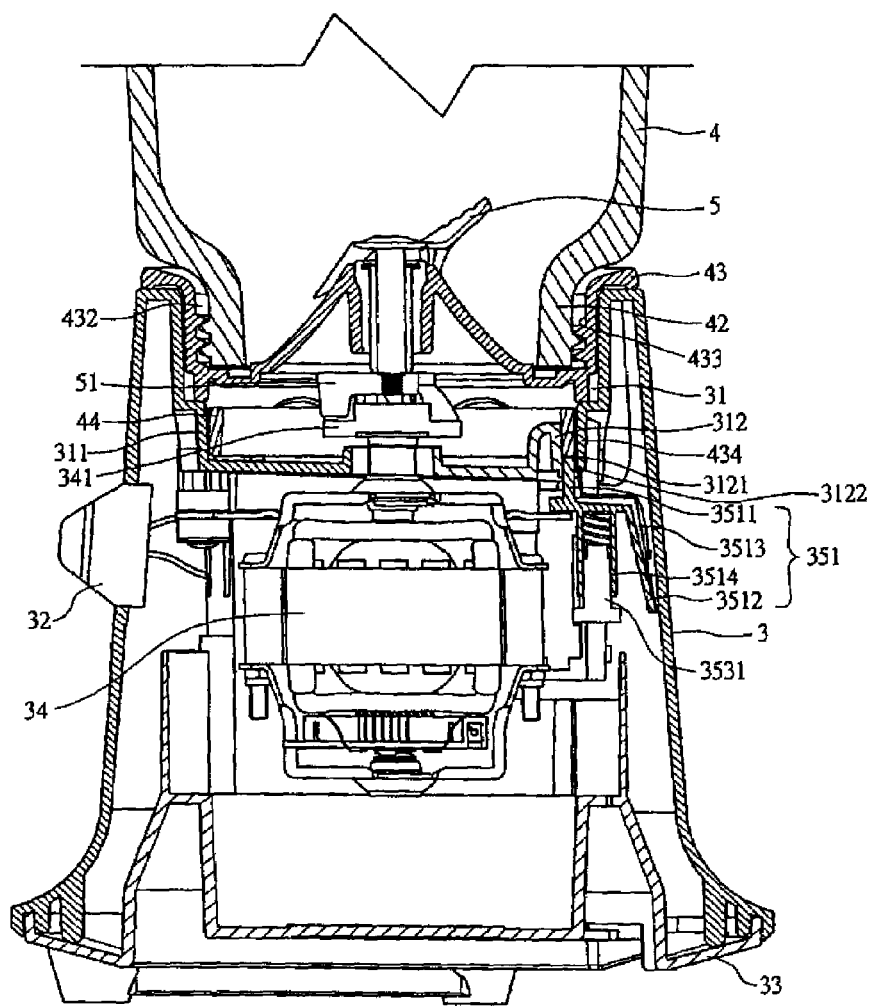
FIG. 8 is a cross-sectional view of the blender of the present invention.

Also referring to FIGS. 5 and 8, to practice the present invention, the cutter set 5 is put above the bore 436 of the container retainer 43 and then moved downward to have the shaft portion thereof extending through the bore 436. The driven disk 51 is then coupled to the lower end of the shaft portion of the cutter set 5. Thereafter, the pegs 4411 of the movable member 44 are put through the through holes 435 of the container retainer 43 and at the same time, the posts 4342 of the container retainer 43 are received through the upper openings 4241 of the cylinders 442 of the movable member 44. The resilient elements 443 are put into the cylinder 442 through the lower opening 4422 and fit over the posts 4342 and secured thereto by the bolts 444. As a consequence of these operations, the container retainer 43 and the movable member 44 are fixed together. The micro-switch substrate 352 of the safety switch 35 is fit into the receiving slot 3532 of the substrate support 353 and the resilient element 354 is put over the retention pin 3531 of the substrate support 353. The collar 3514 of the actuator 351 is then fit over the retention pin 3531 of the substrate support 353. The safety switch 35, including the actuator 351, the micro-switch substrate 352, and the substrate support 353, is then fixed in the housing of the base 3 by fasteners S with the bar 3511 of the actuator 351 extending through the through hole 3122 of the positioning seat 312 of the base 3. Thereafter, the driving disk 341 is then secured to the spindle of the motor 43 and the bottom lid 33, together with the motor 34, is mounted to the lower end of the housing of the base 3 to allow the spindle of the motor 34 and the driving disk 341 located inside the housing.

Figure 6:
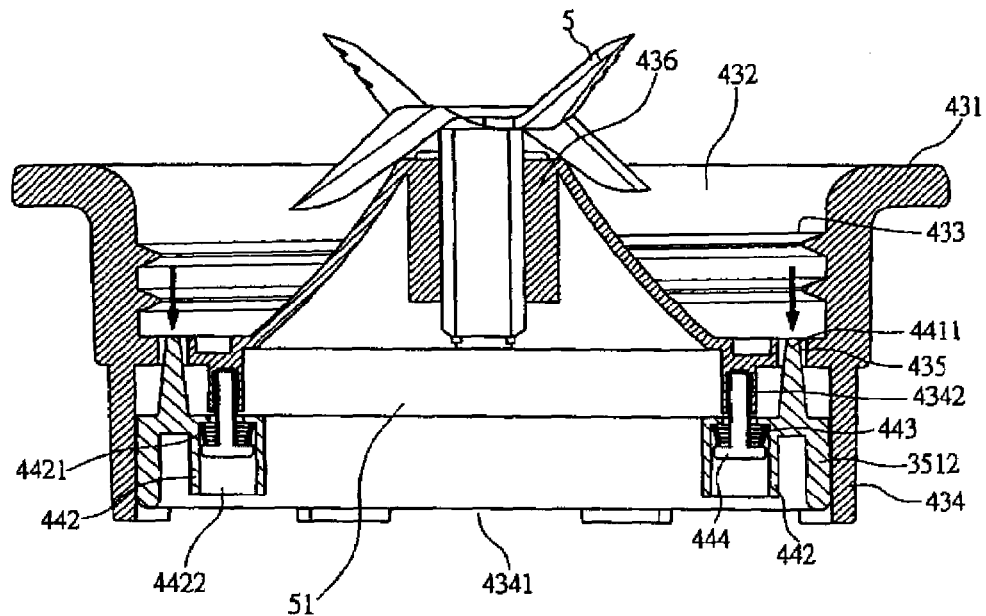
FIG. 6 is a cross-sectional view similar to FIG. 5, but showing the movable member is depressed downward.
Figure 7:
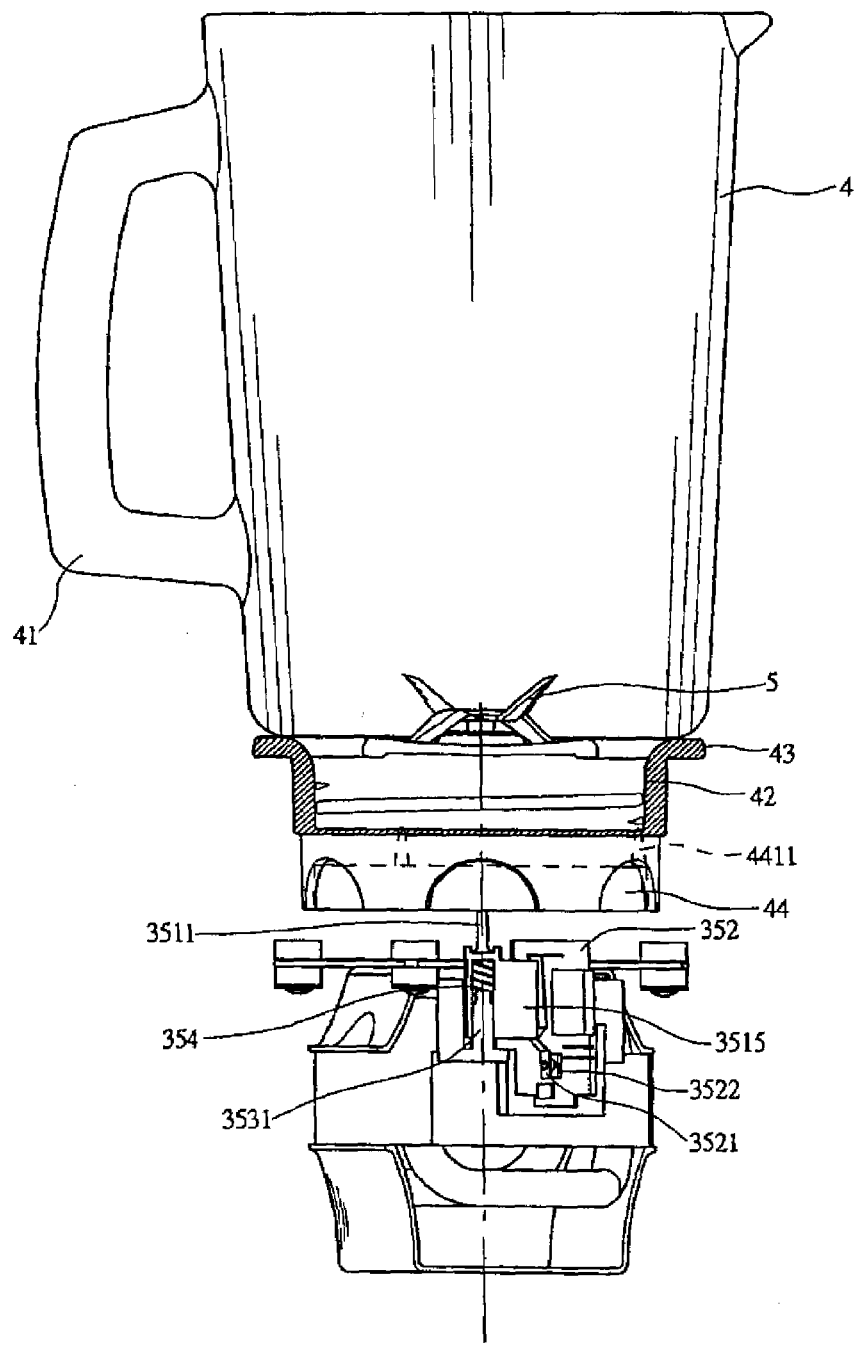
FIG. 7 is a perspective view of the blender of the present invention with the housing of a base removed to illustrate the actuation of the safety switch.

Referring to FIGS. 6-8, to operate the blender 2 for making for example juice, the container retainer 43 is attached to the lower end of the container 4 by threading engagement between the threaded section 42 of the container 4 and the threaded section 433 of the container retainer 43. With the progress of threadingly attaching the container 4 to the container retainer 43, the bottom edge of the threaded section 42 of the container 4 gets into contact with the peg 4411 of the movable member 44 thereby depressing the movable member 44 downward with respect to the bottom of the container retainer 43. After the threading engagement between the container 4 and the container retainer 43 is completely done, the container 4, together with the container retainer 43, is put into the upper receiving space 31 of the base 3 with the positioning projections 311 and the positioning seat 312 received into and stably retained in the recesses 4341 of the circumferential wall 434 of the container retainer 43 to ensure proper positioning of the container 4 with respect to the base 3. The movable member 44 that is depressed by the bottom edge of the threaded section 42 of the container 4 is located substantially flush with the lower edge of the circumferential wall 434. Preferably, the movable member 44 is provided with more than one peg 4411 to ensure uniform application of depression force to the movable member 44 by the container 4 and thus preventing undesired inclination of the movable member 44 during the process of depression. Thus, when the container retainer 43 is received in the receiving space 31 of the base 3, the movable member 44 is exactly located in the central groove 3121 of the positioning seat 31 to thereby depress the bar 3511 of the actuator 351 that extends through the through hole 3122 of the positioning seat 312. The actuator 351 is thus moved downward against the resilient element 354, and the drive plate 3515 engages and forces a trigger plate 3521 of the micro-switch substrate 352 to engage a contact pad 3522 thereby conducting the safety switch 35 to supply power to the motor 34. The motor 35 then drives the driving disk 341, which is put in driving engagement with the driven disk 51 that is coupled to the shaft portion of the cutter set 5. Thus, the cutter set 5 is driven by the motor 34 through the engagement between the driving disk 341 and the driven disk 51.

Also referring to FIG. 8, the actuator 351 is provided with the chute 3512 and the barrier walls 3513 so that when liquid or water penetrates through the hole 3122 of the positioning seat 312 and leaks into the housing of the base 3, the barrier walls 3513 function to keep the liquid or water within the chute 3512 so as to be guided by the chute 3512 to the bottom of the base 3 and thus preventing the liquid or water from spreading to the micro-switch substrate 352 or the motor 35, which may lead to damage to the circuit associated with the micro-switch substrate 352 and/or the motor 34.

The present invention features the movable member 44 arranged inside the circumferential wall 434 of the container retainer 43 and the movable member 44 is moved downward due to the depression of the peg 4411 of the movable member 44 by the container 4 when the container 4 is mounted to the container retainer 43. The movable member 44 is thus downward moved to a location substantially flush with the recesses 4341 of the container retainer 43 and the circumferential wall of the movable member 44 is received into the groove 3121 of the positioning seat 312 of the base 3. This causes the bar 3511 of the actuator 351 of the safety switch 35 to be depressed to actuate the safety switch 35, turning on the motor 34. Since the movable member 44 can be depressed only when the container 4 and the container retainer 43 are mounted to each other, the bar 3511 of the safety switch 35 can then be depressed to actuate the safety switch 35. Therefore, if the container retainer 43 is individually mounted to the receiving space 31 of the base 3 without the container 4 mounted thereon, the safety switch 35 cannot be actuated to cause the motor 34 to drive the cutter set 5. As a result, unexpected actuation of the motor 35 to drive the cutter set 5 due to accident contact of the control knob 32 will not happen, and operation safety is ensued and enhanced.

Although the present invention has been described with reference to the preferred embodiment thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A blender, comprising:
   a base defining an upper receiving space delimited by a circumferential wall having an inside surface on which a plurality of positioning projections and a positioning seat, the positioning seat defining a through hole, the base housing a motor that is connected to a safety switch, the safety switch comprising a bar received in the through hole of the positioning seat;
   a container having a lower end to which a container retainer is releasably mounted, the container retainer forming a plurality of recesses corresponding to and fit over the positioning projections, a movable member mounted to the container retainer, the movable member forming at least one peg extending through the container retainer;

a cutter set rotatably mounted to the container retainer; and a cover removably mounted to an upper opening of the container, and characterized in that a plurality of posts each forming an internally-threaded hole extends from a bottom of the container retainer and that the movable member comprises a plurality of lugs each forming a hollow cylinder for respectively receiving the posts therein, a resilient element being received in each hollow cylinder and acting between the post and the hollow cylinder, wherein by mounting the container retainer to the lower end of the container, a lower edge of the container depresses the peg downward to move the movable member downward to cause the movable member fit into the positioning seat so as to further depress the bar of the safety switch downward to actuate the safety switch for turning on the motor and thus driving the cutter set.

2. The blender as claimed in claim 1, wherein the movable member forms a plurality of pegs.

3. The blender as claimed in claim 1, wherein the container retainer comprises a circumferential wall having a circumferential edge in and along which the recesses are defined.

4. The blender as claimed in claim 1, wherein the resilient element is of a conic shape.

* * * * *